(12) United States Patent
Fore, III

(10) Patent No.: US 8,721,220 B2
(45) Date of Patent: May 13, 2014

(54) SYSTEMS AND METHODS OF PROVIDING A BARRIER

(75) Inventor: Pat Halton Fore, III, Gulfport, MS (US)

(73) Assignee: Fore Construction, Gulfport, MS (US)

( * ) Notice: Subject to any disclaimer, the term of this patent is extended or adjusted under 35 U.S.C. 154(b) by 218 days.

(21) Appl. No.: 13/156,264

(22) Filed: Jun. 8, 2011

(65) Prior Publication Data

US 2012/0315091 A1 Dec. 13, 2012

(51) Int. Cl.
*E02B 15/06* (2006.01)

(52) U.S. Cl.
USPC ............................. 405/60; 405/16; 405/302.7

(58) Field of Classification Search
USPC ........ 405/302.7, 302.6, 302.4, 15, 16, 17, 21, 405/34, 35, 60, 72, 115
See application file for complete search history.

(56) References Cited

U.S. PATENT DOCUMENTS

| | | | | |
|---|---|---|---|---|
| 5,108,224 A | * | 4/1992 | Cabaniss et al. | 405/302.7 |
| 5,591,333 A | * | 1/1997 | Hobin et al. | 405/72 |
| 5,779,392 A | * | 7/1998 | Mendes | 405/60 |
| 5,885,451 A | * | 3/1999 | Porrovecchio, Sr. | 210/242.4 |
| 6,146,529 A | * | 11/2000 | McCrory | 210/242.4 |
| 6,558,075 B2 | * | 5/2003 | Benedict et al. | 405/15 |
| 6,626,611 B2 | * | 9/2003 | Winters et al. | 405/302.6 |
| 6,632,501 B2 | * | 10/2003 | Brownstein et al. | 428/74 |
| 6,692,188 B1 | * | 2/2004 | Walker et al. | 405/115 |
| 2006/0096910 A1 | * | 5/2006 | Brownstein et al. | 210/490 |
| 2006/0133900 A1 | * | 6/2006 | Singleton | 405/302.7 |
| 2007/0217871 A1 | * | 9/2007 | Kerman | 405/302.7 |
| 2008/0112766 A1 | * | 5/2008 | Kerman | 405/302.7 |
| 2011/0293373 A1 | * | 12/2011 | Hubbell, Jr. | 405/63 |
| 2011/0305517 A1 | * | 12/2011 | Borries | 405/63 |

* cited by examiner

*Primary Examiner* — Frederick L Lagman
(74) *Attorney, Agent, or Firm* — Benjamin A. Balser; Balser & Grell IP Law

(57) ABSTRACT

Systems and methods for providing a barrier are presented. Example embodiments of the disclosed systems protect a selected shoreline or other area from contaminated water. In example embodiments, a support frame is provided and a barrier fabric is attached to the support frame. The support frame is then attached to support poles which have been driven into the earth such that the barrier fabric surrounds the selected area to be protected. Example embodiments of the barrier fabric allow tidal water to flow through the fabric while absorbing the oil and for hindering the oil from passing through. In this way, the selected area is protected from oil contamination.

20 Claims, 9 Drawing Sheets

SYSTEMS AND METHODS OF PROVIDING A BARRIER

TECHNICAL FIELD

The present disclosure is generally related to fluids, and, more particularly, to a fluid barrier.

BACKGROUND

There are many oil wells stationed in the bodies of water around the world. Inherently with those oil wells is the possibility of a leak or a disaster in which oil is released from the floor of the body of water into the surrounding body of water. In the initial stages of an oil spill, tens of thousands of barrels of oil per day may flow from the well. Some of the escaped oil may evaporate. Some of it may be contained or dispersed. But there is a great chance that much of the oil may reach the surrounding shorelines. Coastal countermeasures may be used to protect the bays, lagoons, and shorelines of those surrounding areas. Skimmers and booms may be used to protect these shorelines. If the oil remains out on the open sea, the effects may be relatively limited. The negative effects on the environment increase dramatically when the oil spill reaches the shore. The effects on coastal flora and fauna are serious and the reduced phytoplankton productivity and direct damage to seabirds and other species are severely damaged. There are heretofore unaddressed needs related to preventing the spill from reaching the shorelines.

SUMMARY

Example embodiments of the present disclosure provide systems of providing a barrier. Briefly described, in architecture, one example embodiment of the system, among others, can be implemented as follows: a plurality of support poles; a support frame attached to the plurality of support poles; and an oil absorbing material attached to the support frame.

Embodiments of the present disclosure can also be viewed for providing methods of providing a spill barrier. In this regard, one embodiment of such a method, among others, can be broadly summarized by the following steps: Providing oil absorbing material on a support frame; inserting support poles around a selected shoreline area to be protected from encroaching oil; and attaching the support frame to the support poles to protect the selected shoreline area from the encroaching oil.

DETAILED DESCRIPTION

Embodiments of the present disclosure will be described more fully hereinafter. With reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Disclosed herein are systems and methods of providing a barrier for preventing a particular solid, liquid or gas from penetrating the barrier and accessing an area to be protected. In an example embodiment, an absorbent material is inserted into a body of water or on a shoreline of a body of water such that the particular solid, liquid, or gas may not pass through the barrier. For example, with an oil spill in a gulf, the material may be placed across a coastal area to prevent the oil which has been spilled in the body of water to reach the shoreline. Although an oil spill is used as an example fluid to be prevented from passing through the barrier, the methods and systems disclosed herein are applicable to other solids, liquids, or gases for which the barrier operates in a substantially similar manner.

Figure 1:
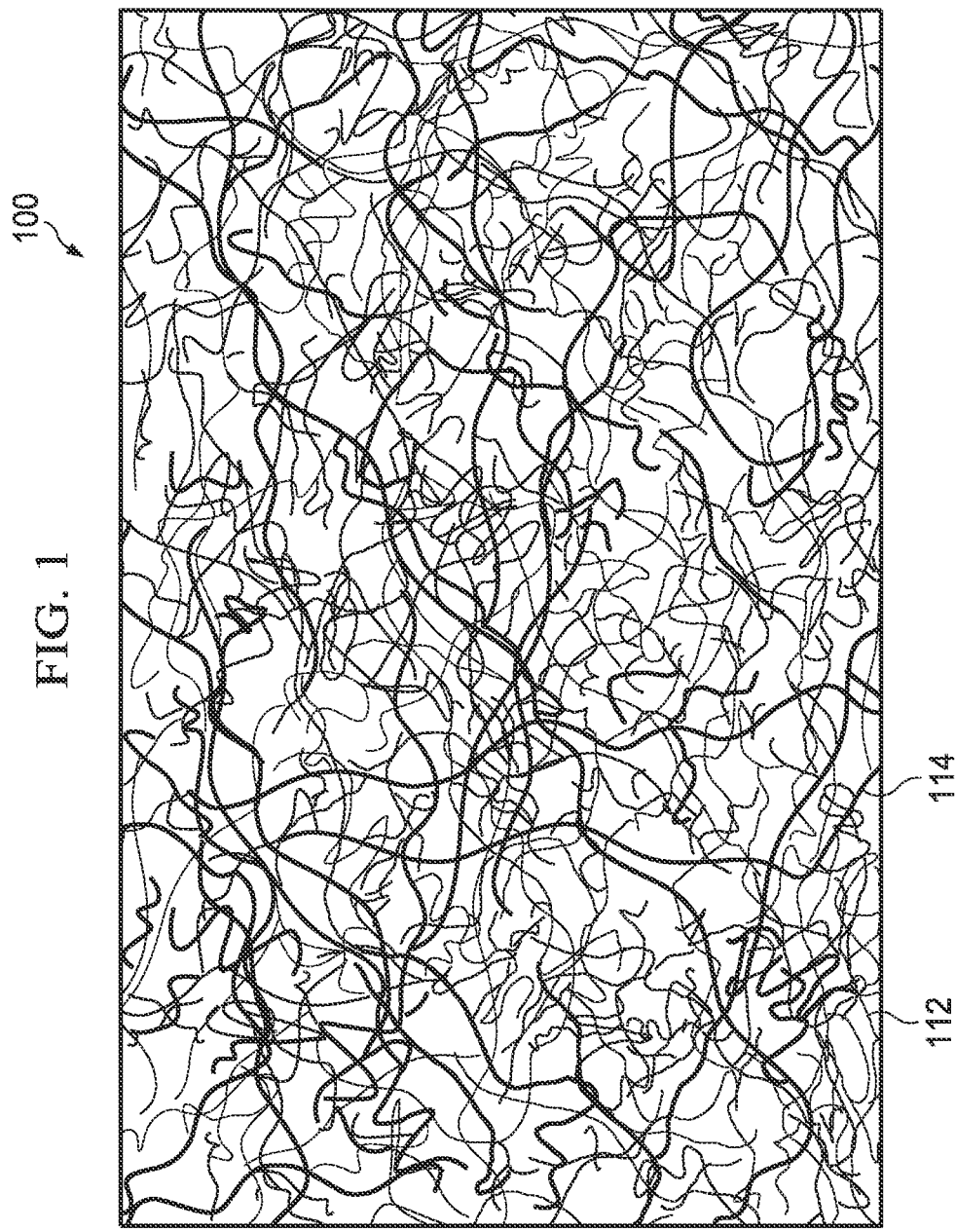
FIG. 1 is a schematic view of an example embodiment of a fiber that is used in an absorbent fabric material to be used in the systems and methods of providing a barrier.

In an example embodiment, the barrier may be made from absorbent and/or adsorbent filter material 100 as provided in FIG. 1. In an example embodiment, filter material 100 may be constructed of, for example, a mass of delustered hydrophobic and lipophilic fibers 112, 114. In an example embodiment, fibers 112, 114 may be mixed together to form a cohesive wad of fibers. The wad may have a substantial volume of internal interstices available to absorb a liquid hydrocarbon or an organic liquid, and the surfaces of fibers 112, 114 also adsorb that liquid. The combination of absorption and adsorption enables fibers 112, 114 to sorb up to twenty times their own weight of hydrocarbon, or organic liquid, solid, or gas. Preferably, a majority of fibers 112, 114 are of a relatively shorter length while a minority of fibers 112, 114 are of a relatively longer length. The longer fibers help bind the wad together into a cohesive mass that has a substantial volume of internal interstices. After a short time during which the example hydrocarbon is sorbed, the wadded mass may be collected, pressed to recover the hydrocarbon, and recycled. In an example embodiment, the exact proportions of individual fibers 112, 114 are not critical. In an example embodiment, filter material 100 may also be delustered to improve the sorbancy of fibers 112, 114.

In an example embodiment, the barrier provides the benefit of allowing tidal water to flow through the fabric while absorbing oil or hindering the passage of oil as tidal water passes through the fabric. Even emulsified oil created by dispersants used to disperse the oil spill in open waters may be absorbed. In example applications, the oil has a higher viscosity than the water which allows the water to pass through the barrier fabric and traps the oil. The oil may be absorbed by the fabric until the fabric becomes saturated. When the barrier fabric becomes saturated, it may be replaced with a fresh barrier. The saturated barrier may be discarded or cleaned and recycled.

In an example embodiment, a wire backing may provide additional support and strength to maintain the integrity of the fabric against the tidal ebb and flow through the barrier fabric. In an example embodiment, the barrier may be installed and the barrier fabric may be sprayed with water that has been mixed with a microbial solution. The barrier fabric may absorb the oil passing through it, protecting the shoreline, animals, and plant life behind it. The microbial solution that is dispersed throughout the barrier fabric may then begin remediation of the oil molecules trapped in the barrier fabric.

Figure 2:
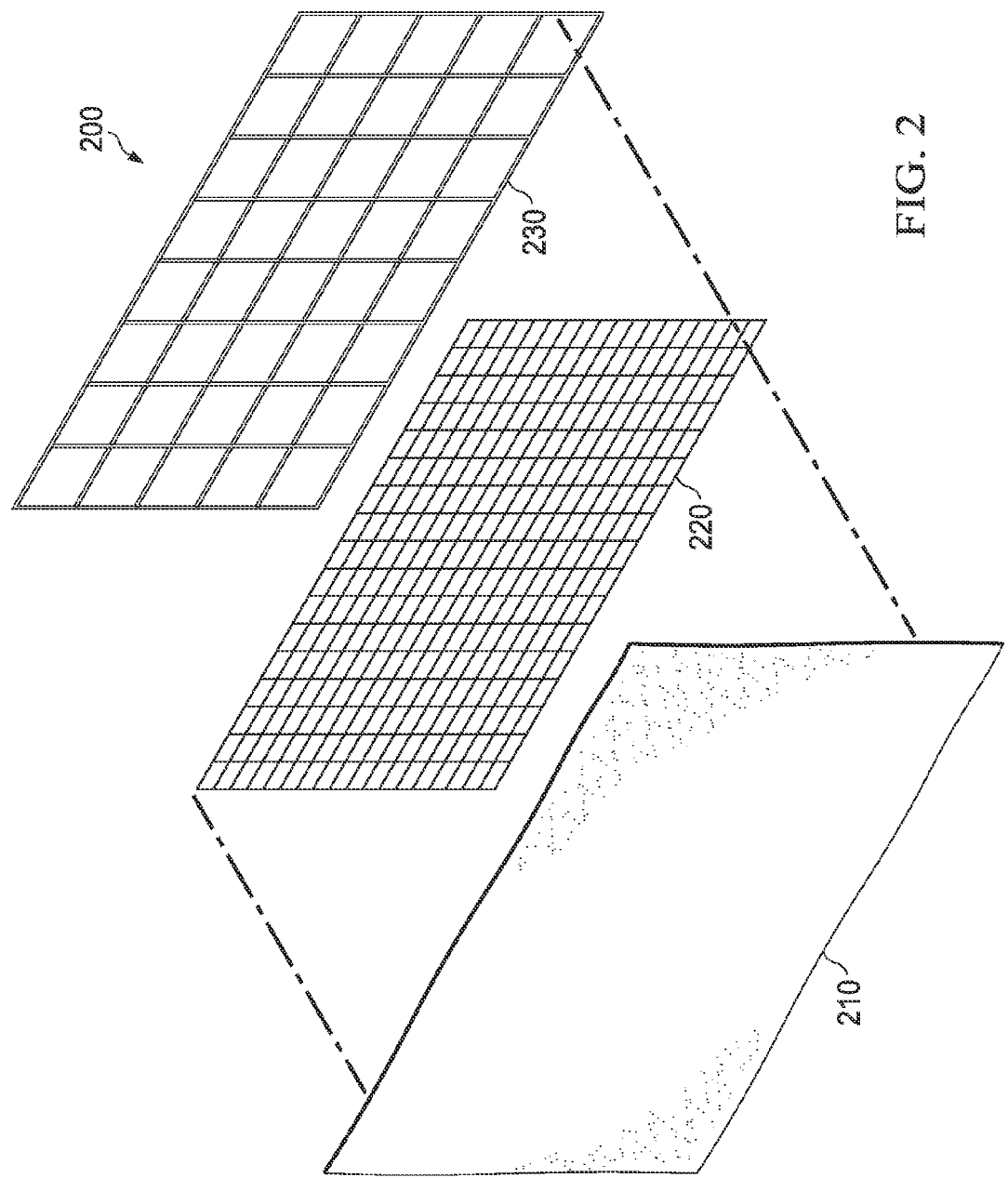
FIG. 2 is an exploded system diagram of an example embodiment of a barrier

FIG. 2 provides an exploded view of a frame for the barrier with barrier fabric 210 to be attached. Relatively widely-spaced first sub-frame 230 is positioned to support smaller-spaced second sub-frame 220. Sub-frame 220 and sub-frame 230 are connected together in example embodiments. Barrier fabric 210 may then be positioned to wrap around the support frame comprised of first sub-frame 230 and second sub-frame 220. One or both of sub-frames 220 and 230 may be comprised of welded wire, for example. In an example embodiment, first sub-frame 230 comprises six gauge wire with first wire spacing of six inches by six inches. Second sub-frame 220 comprises 14 gauge wire with second spacing of two inches by 4 inches. Spacing of sub-frames 220 and 230 may either or both be wider than taller, taller than wider, or substantially the same.

Barrier fabric 210 may be comprised of any fabric or material that allows one liquid or gas to pass through the fabric or material, but substantially absorbs, adsorbs, or hinders a second liquid, or gas, from passing through, for example, by osmosis. Osmosis is the diffusion of a substance through a semipermeable membrane. Barrier fabric 210 functions as a semipermeable membrane. A semipermeable membrane, also termed a selectively-permeable membrane, a partially-permeable membrane or a differentially-permeable membrane, is a membrane that will allow certain molecules, ions, liquids, or gases to pass through it by diffusion and occasionally specialized "facilitated diffusion." The rate of passage depends on the pressure, concentration, and temperature of the molecules or solutes on either side, as well as the permeability of the membrane to each solute. Depending on the membrane and the solute, permeability may depend on solute size, solubility, properties, or chemistry. How the membrane is constructed to be selective in its permeability will determine the rate and the permeability.

An example of a semi-permeable membrane is a lipid bilayer, on which is based a plasma membrane that surrounds all biological cells. Many natural and synthetic materials thicker than a membrane are also semipermeable. One example of this is the thin film on the inside of an egg. Another example of a semipermeable membrane which is very specific in its permeability is a phospholipid bilayer, a group of phospholipids (consisting of a phosphate head and two fatty acid tails) arranged into a double-layer. The hydrophilic phosphate heads are in the outside layer and exposed to the water content outside and within the cell. The hydrophobic tails are the layer hidden in the inside of the membrane. The phospholipid bilayer is the most permeable to small, uncharged solutes. Protein channels float through the phospholipids, and, collectively, this model is known as a fluid mosaic model.

In the process of reverse osmosis, thin film composite membranes (TFC or TFM) are used. These are semipermeable membranes manufactured principally for use in water purification or desalination systems. They also have use in chemical applications such as batteries and fuel cells. In essence, a TFC material is a molecular sieve constructed in the form of a film from two or more layered materials. Membranes used in reverse osmosis are, in general, made out of polyimide, chosen primarily for its permeability to water and relative impermeability to various dissolved impurities including salt ions and other small molecules that cannot be filtered. Another example of a semipermeable membrane is dialysis tubing. Other types are cellulose ester membrane (CEM), charge mosaic membrane (CMM), bipolar membrane (BPM), anion exchange membrane (AEM), alkali anion exchange membrane (AAEM), and proton exchange membrane (PEM). In an example embodiment, barrier fabric 210 comprises X-Tex fabric as manufactured by Xextex Corporation. In an alternative embodiment, barrier fabric 210 attracts water while beading up the oil. Barrier fabric 210 may comprise any semi-permeable membrane material.

Figure 3:
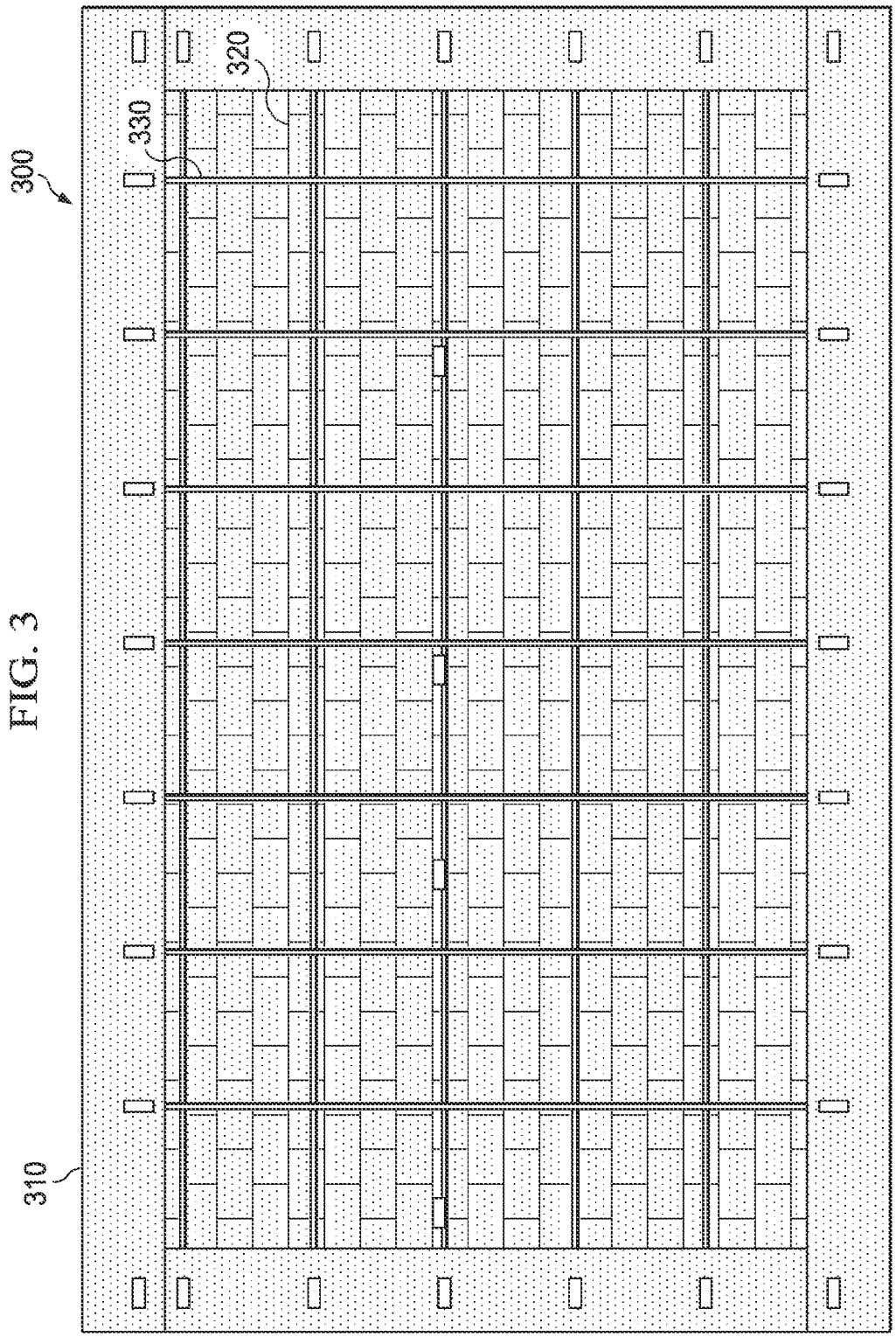
FIG. 3 is a system diagram of an example embodiment of the barrier of FIG. 2.

FIG. 3 provides an example embodiment of assembled barrier 300. Barrier 300 comprises widely-spaced sub-frame 230, smaller-spaced sub-frame 320 and barrier fabric 310. Barrier fabric 310 is wrapped around the edges of the support frame comprising sub-frames 320 and 330. In an example embodiment, clips may be used to attach barrier fabric 310 to the support frame comprising sub-frames 320 and 330. Clips may be steel, plastic, or other materials. In an example embodiment, barrier fabric 310 is pulled tight across the support frame and the access is overlapped and secured to the wire panels with clips such that no holes are made in barrier fabric 310, thereby maintaining the integrity of barrier fabric 310. In an alternative embodiment, the frame may be comprised of a single frame member with a single spacing, or with integrated multiple spacings. One or both of sub-frames 320 and 330 may be comprised of welded wire, as a non-limiting example. In an example embodiment, first sub-frame 330 comprises six gauge wire with first wire spacing of six inches by six inches. Second sub-frame 320 comprises 14 gauge wire with second spacing of two inches by 4 inches. Spacing of sub-frames 320 and 330 may either or both be wider than taller, taller than wider, or substantially the same.

Figure 4:
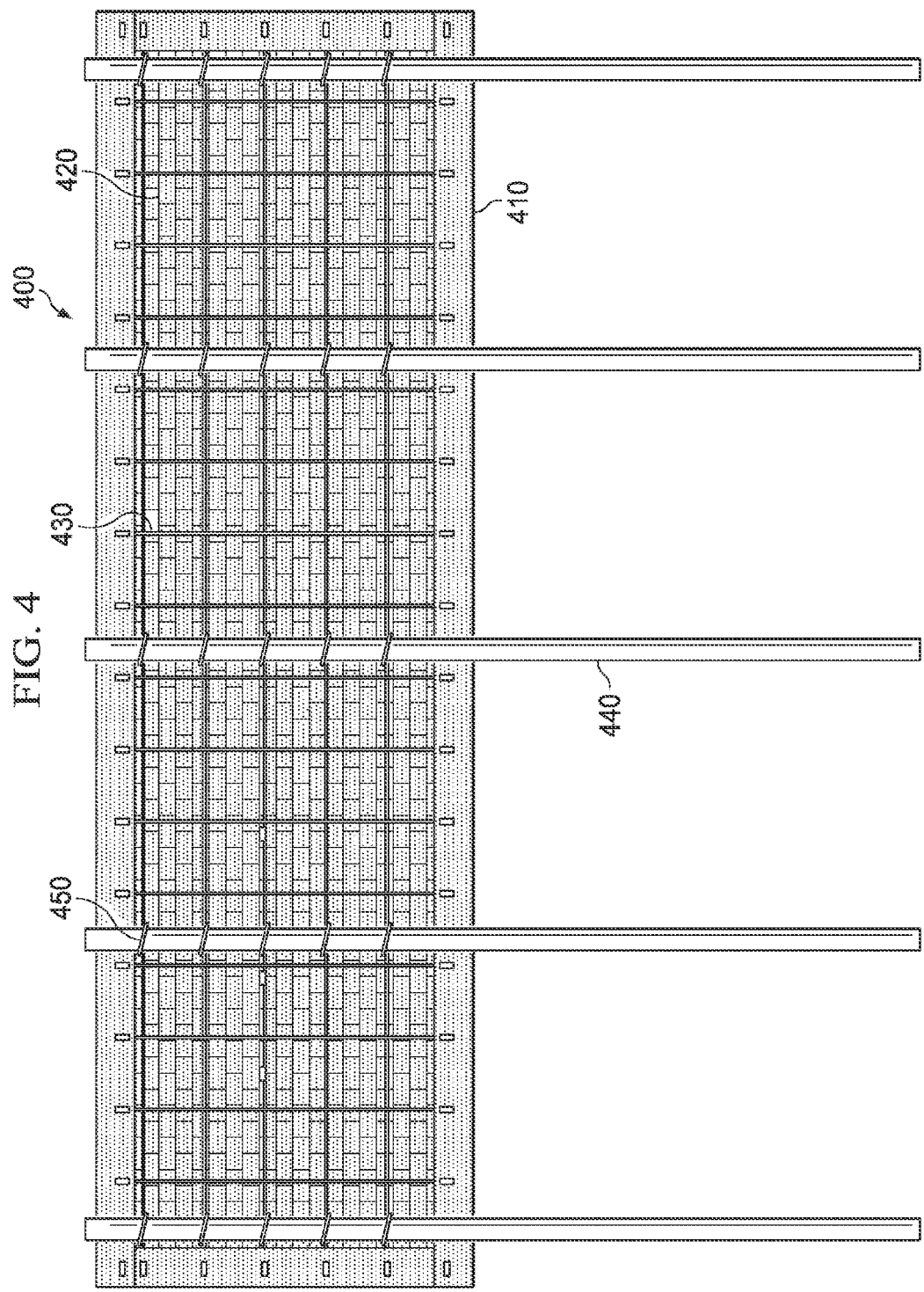
FIG. 4 is a system diagram of an example embodiment of the barrier of FIG. 3 as attached to support poles.

FIG. 4 provides an example embodiment of barrier 400 with the frame attached to the poles. Barrier 400 comprises first sub-frame 420, second sub-frame 430, barrier fabric 410, a plurality of support poles 440 and connectors 450. Support poles 450 may be driven into the ground and barrier 400 including sub-frames 420, 430 and fabric 410 are attached to support poles 440 with connectors 450. In an alternative embodiment, the frame may be comprised of a single frame member with a single spacing, with a plurality of sub-frames with various spacings, or a single frame with integrated multiple spacings. Connectors 450 connect the frame to support poles 440 such that connectors 450 do not go through barrier fabric 410. This maintains the integrity of barrier fabric 410. In an example embodiment, support poles 440 are driven 3 feet into the ground and are spaced substantially 4 feet apart such that a 6 pole section provides 20 linear feet of barrier and the bottom of barrier fabric 410 is against the ground or the floor of the body of water. Support poles 440 may be for example, but not limited to, galvanized steel or t-post style. One or both of sub-frames 420 and 430 may be comprised of welded wire, as a non-limiting example. In an example embodiment, first sub-frame 430 comprises six gauge wire with first wire spacing of six inches by six inches. Second sub-frame 420 comprises 14 gauge wire with second spacing of two inches by 4 inches. Spacing of sub-frames 420 and 430 may either or both be wider than taller, taller than wider, or substantially the same.

Figure 5:
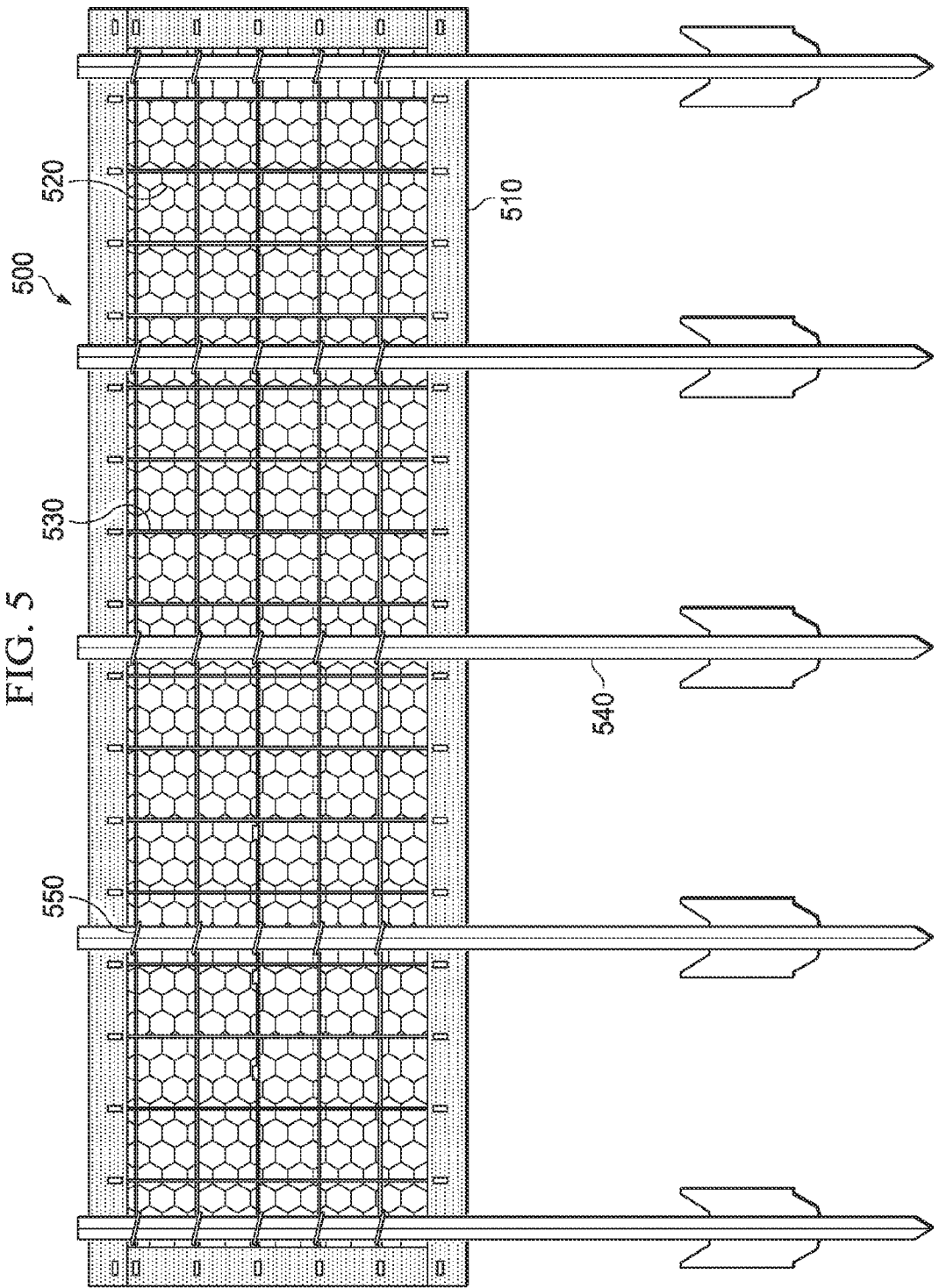
FIG. 5 is a system diagram of an example embodiment of the barrier of FIG. 3.

FIG. 5 provides an alternative embodiment of barrier 500. Barrier 500 comprises barrier fabric 510, first sub-frame 530, second sub-frame 520, support poles 540, and connectors 550. Sub-frame 520 is connected to sub-frame 530. Sub-frame 520 may have, for example, a hexagonal pattern, or any other pattern. Sub-frame 520 may provide support for barrier fabric 510 and/or subframe 520 may hinder barrier fabric 510 from moving in and out with the movement of the water it may be positioned in. Sub-frame 530 may provide support for barrier fabric 510 and/or subframe 530 may hinder barrier fabric 510 from moving in and out with the movement of the water it may be positioned in. In an alternative embodiment, there may be a single sub-frame to which barrier fabric 510 is attached.

Figure 6:
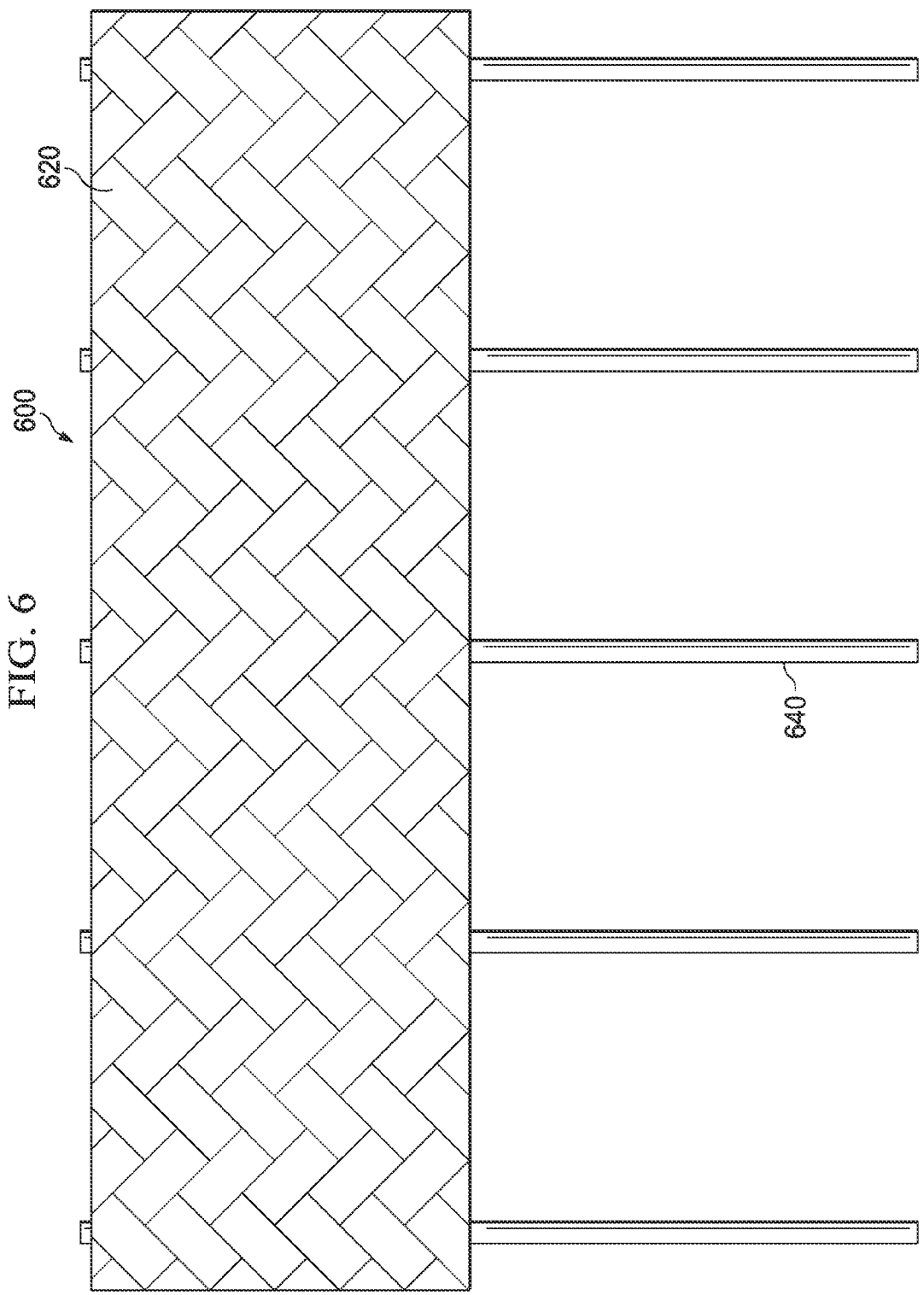
FIG. 6 is a system diagram of an exemplary embodiment of the backside of the barrier of FIG. 3.

FIG. 6 provides a front view of an example embodiment of barrier 600. In this example embodiment, barrier 600 is connected to support poles 640 as viewed from the oil-spill-side of the body of water. As the water passes through barrier fabric 620, the oil, for example, substantially remains on the oil-spill-side of barrier 600.

Figure 7:
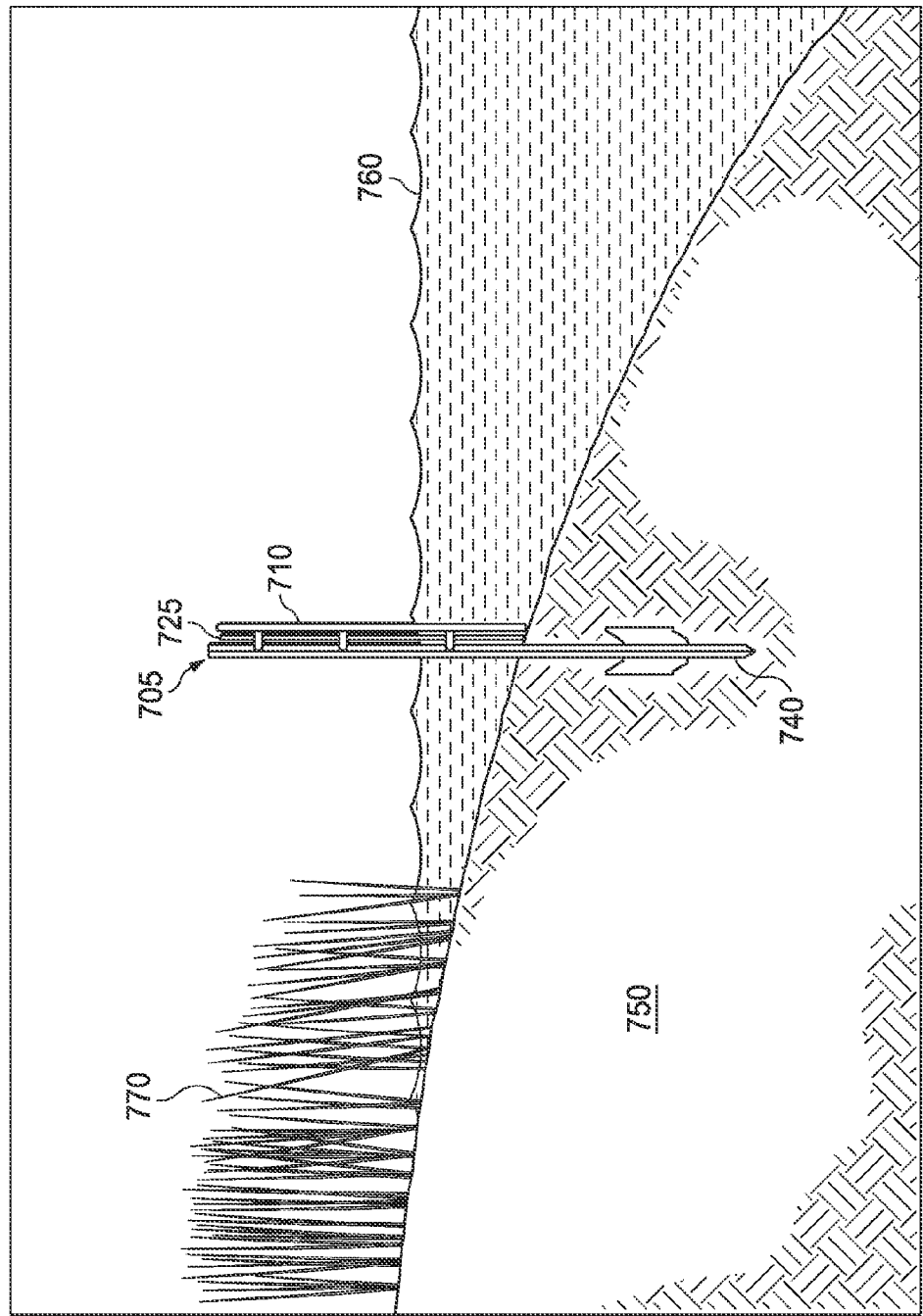
FIG. 7 is a system diagram of an example embodiment of the barrier of FIG. 4 as installed in the ground.

FIG. 7 provides side view 700 of an example embodiment of barrier 705 installed into ground 750 near marsh area 770 to be protected. Support poles 740 are driven into ground 750 and barrier 705 is attached to support poles 740 such that the bottom of barrier fabric 710 rests on ground 750 or the floor of body of water 760. Barrier 705 comprises support frame 725 and barrier fabric 710. In an example embodiment, marsh area 770, an area to be protected, is on the pole side of barrier 705 and the oil contamination in body of water 760 is on the fabric side of barrier 705.

Figure 8:
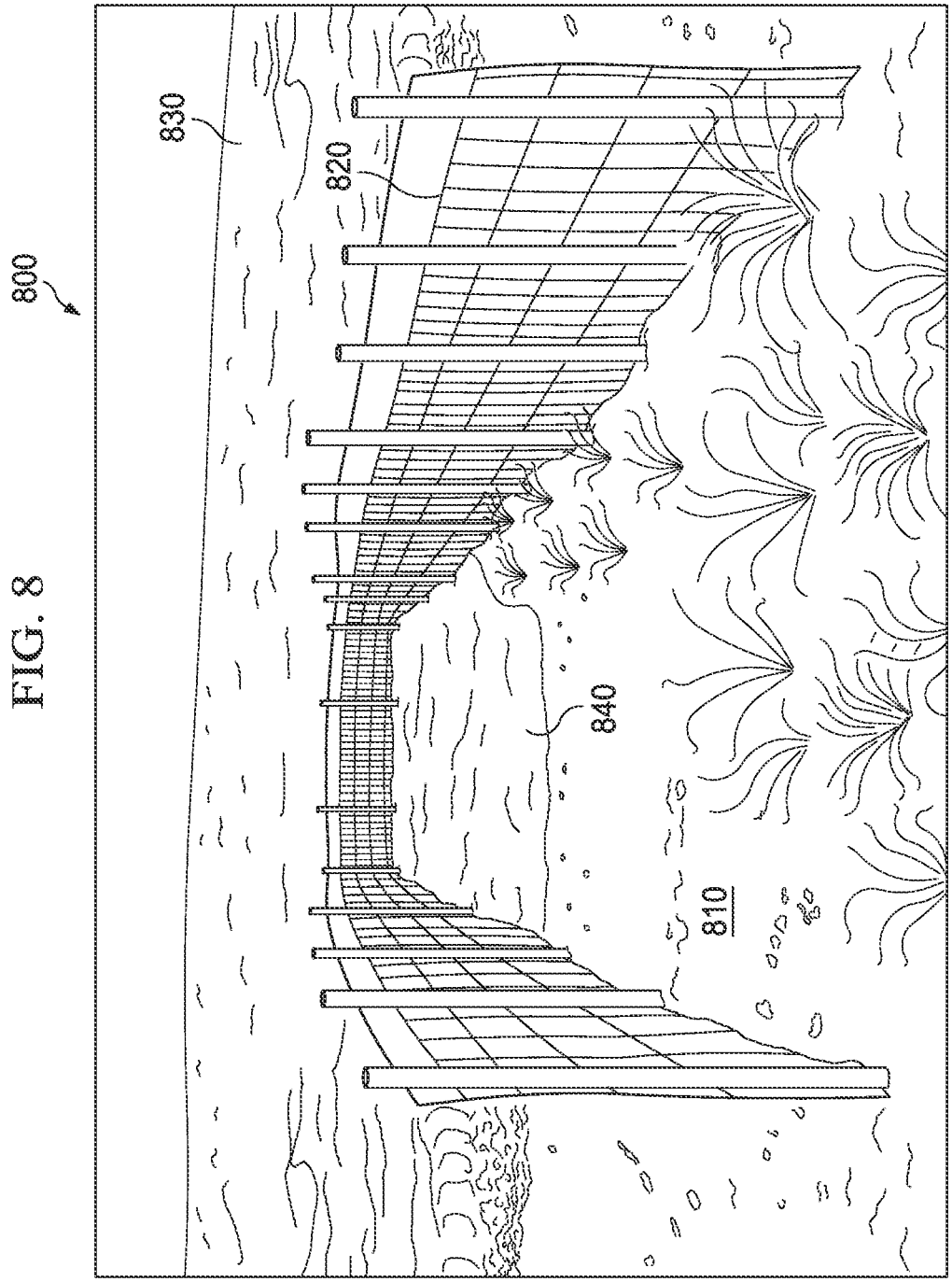
FIG. 8 is a system diagram of an example embodiment of the barrier of FIG. 4 positioned around a water inlet.

FIG. 8 provides diagram 800 of barrier 820 protecting a water inlet. The support poles in barrier 820 are driven into ground 810 so that barrier 820 surrounds an inlet underneath water 840. This stops oil from body of water 830 from entering into the inlet underneath the surface of water 840.

Figure 9:
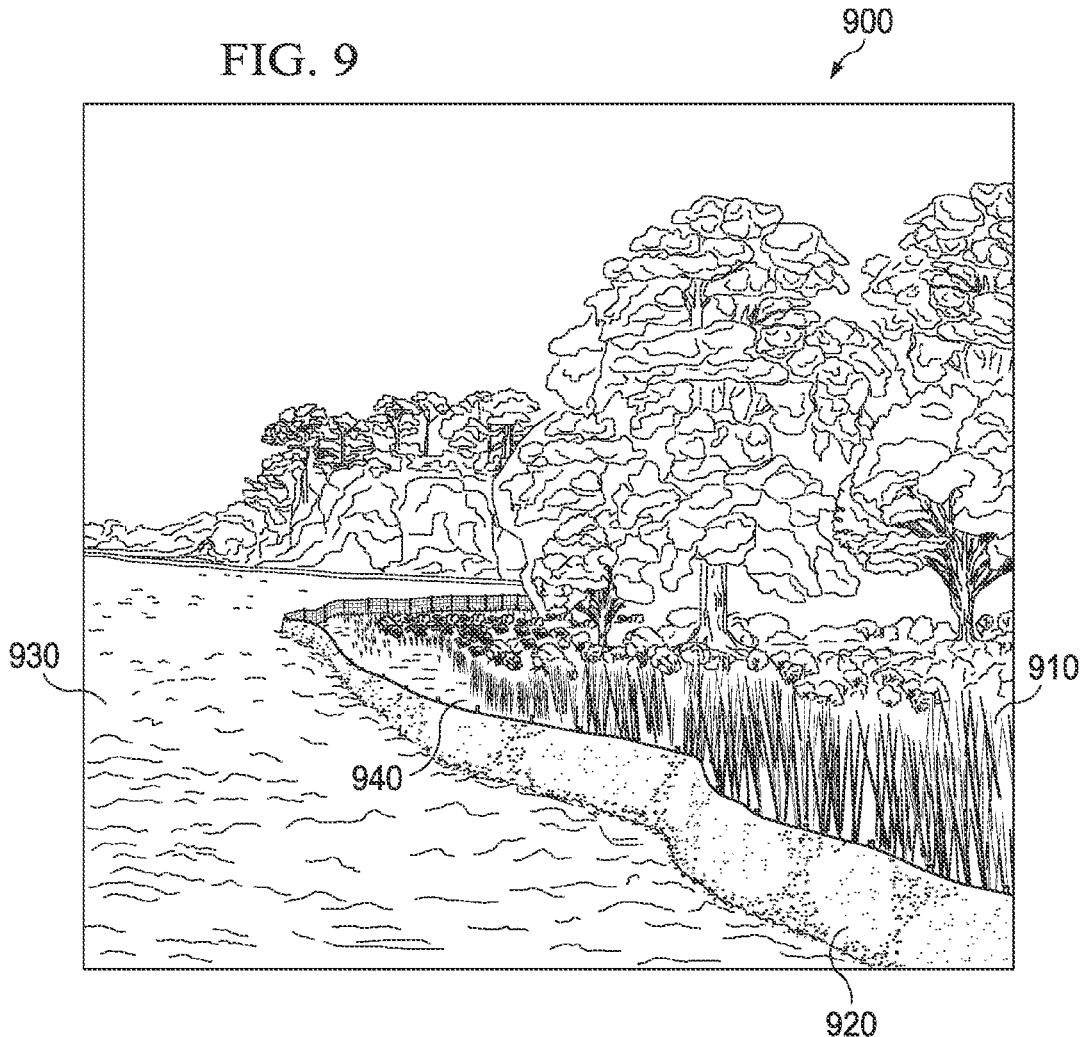
FIG. 9 is a system diagram of an example embodiment of the barrier of FIG. 4 positioned around a coastline.

FIG. 9 provides a diagram 900 of barrier 920 protecting the coastline of marshland 910. Oil in body of water 930 is hindered from passing through barrier 920 such that water 940 along coastline 910 is not contaminated with the oil from body of water 930.

Figure 10:
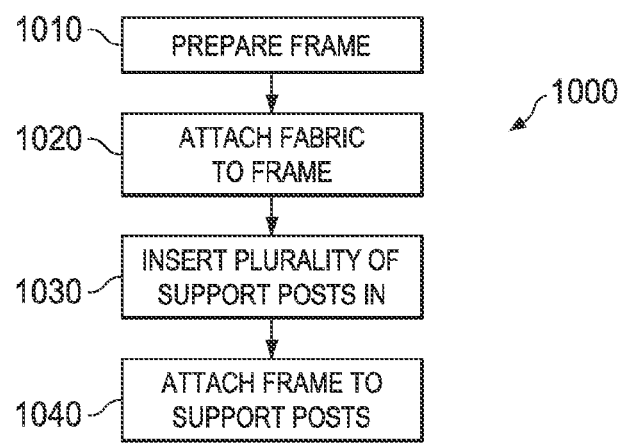
FIG. 10 is a flow diagram of an example embodiment of a method of providing a barrier.

FIG. 10 provides flow diagram 1000 of a method providing barrier 1000. In block 1010, a frame is prepared to support the barrier fabric. In an example embodiment, the frame may comprise two wire mesh frames, a first frame having a wider spacing than the second frame. This prevents the barrier fabric from being pushed in and out and eventually causing holes in the fabric. In block 1020, the barrier fabric is attached to the frame. In block 1030, a plurality of support poles are inserted into the earth around the area that is selected to be protected. In block 1040, the frame is attached to the support poles in such a manner as to not compromise the integrity of the fabric.

In an example embodiment, an additional piece of support frame may be placed on the outside of the barrier fabric and clipped around the outside, still maintaining the integrity of the fabric. This prevents the fabric from billowing out when the tide moves from the shoreline out into the body of water. In an example embodiment, a second frame similar to the first frame may be placed on the outside of the barrier fabric.

In an alternative embodiment, a support system may be suspended from the surface of the body of water with buoys as a non-limiting example. The barrier may be attached to the suspended support system. In an example embodiment, the support system reaches the floor of the body of water. In an example embodiment, the support system is tethered to the floor of the body of water.

Although embodiments in the present disclosure have been described in detail, it should be understood that various changes, substitutions, and alterations can be made thereto without departing from the spirit and the scope of the disclosure as defined by the appended claims.

Therefore, at least the following is claimed:

1. A system of oil barrier comprising:
a plurality of support poles;
a support frame attached to the plurality of support poles, the support frame comprising a first frame with at least one first spacing and a second frame with at least one second spacing, wherein the at least one first spacing is smaller in dimensions than the at least one second spacing; and
an oil absorbing material attached to the support frame.

2. The system of claim 1, wherein the oil absorbing material allows water to pass through the material and hinders oil from passing through the material.

3. The system of claim 1, wherein the first spacing smaller in dimensions than the second spacing.

4. The system of claim 3, wherein the first frame comprises 14 gauge welded wire, the first spacing is 2 inches by 4 inches, the second frame comprises 6 gauge wire, the second spacing is 6 inches by 6 inches, and the support poles are spaced approximately four feet apart.

5. The system of claim 1, wherein the support frame comprises at least a first sub-support frame and a second sub-support frame, the first and second support frames positioned to substantially hinder the oil absorbing material from passing through the support frame.

6. The system of claim 1, further comprising a second support frame attached to an exposed surface of the oil absorbing material.

7. The system of claim 1, wherein the oil absorbing material is wrapped around the edges of the support frame without compromising the integrity of the oil absorbing material and each of the plurality of support poles are attached to the support frame without compromising the integrity of the oil absorbing material.

8. The system of claim 1, wherein the oil absorbing material is X-Tex material.

9. A method of providing an oil spill barrier comprising:
providing oil absorbing material on a support frame with a first frame with at least one first spacing and a second frame with at least one second spacing, wherein the at least one first spacing is smaller in dimensions than the at least one second spacing;
inserting support poles around a selected shoreline area to be protected from encroaching oil; and
attaching the support frame to the support poles to protect the selected shoreline area from the encroaching oil.

10. The method of claim 9, wherein the oil absorbing material allows water to pass through the material and hinders oil from passing through the material.

11. The method of claim 9, wherein the first spacing is smaller in dimensions than the second spacing.

12. The method of claim 11, wherein the first frame comprises 14 gauge welded wire, the first spacing is 2 inches by 4 inches, the second frame comprises 6 gauge wire, the second spacing is 6 inches by 6 inches, and the support poles are spaced approximately four feet apart.

13. The method of claim 9, wherein the support frame comprises at least a first sub-support frame and a second sub-support frame, the first and second support frames positioned to substantially hinder the oil absorbing material from passing through the support frame.

14. The method of claim 9, further comprising a second support frame attached to an exposed surface of the oil absorbing material.

15. The method of claim 9, wherein the oil absorbing material is wrapped around the edges of the support frame without compromising the integrity of the oil absorbing material and each of the plurality of support poles are attached to the support frame without compromising the integrity of the oil absorbing material.

16. The method of claim 9, wherein the oil absorbing material is X-Tex material.

17. An oil absorbing apparatus comprising:
a first support frame with at least one first spacing; and
oil absorbing material attached to the first support frame such that the first support frame may be attached to a second support frame with at least one second spacing without compromising the integrity of the oil absorbing material, wherein the at least one first spacing is smaller in dimensions than the at least one second spacing.

18. The apparatus of claim 17, wherein the second support frame is attached to a system of support poles integrated into the earth.

19. The apparatus of claim 17, wherein the support system is suspended from the surface from the body of water.

20. The apparatus of claim 17, wherein the oil absorbing material is X-Tex material.

\* \* \* \* \*